Figures 1, 2:
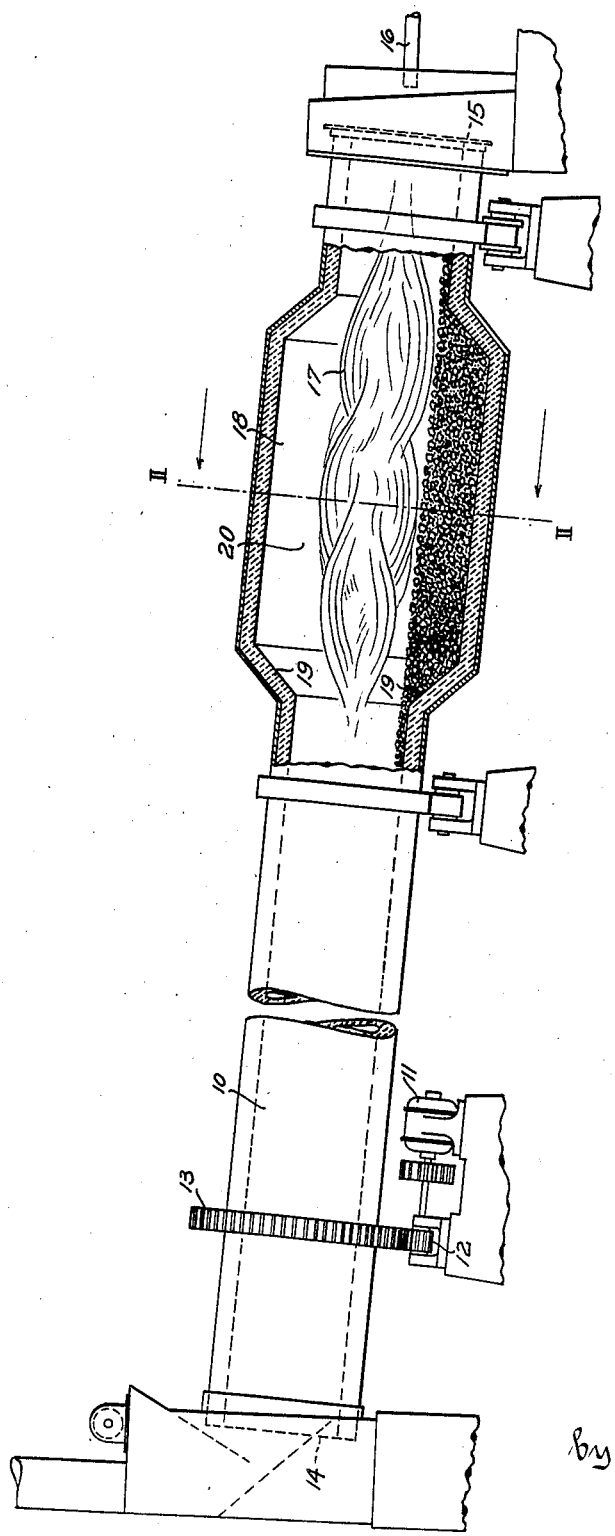

Aug. 29, 1939.   R. C. NEWHOUSE   2,171,507
METHOD OF CALCINING LIME
Filed March 9, 1936

Inventor
R. C. Newhouse
by
Attorney

Patented Aug. 29, 1939

2,171,507

UNITED STATES PATENT OFFICE 2,171,507

METHOD OF CALCINING LIME

Ray C. Newhouse, Wauwatosa, Wis., assignor to Allis-Chalmers Manufacturing Company, Milwaukee, Wis., a corporation of Delaware Application March 9, 1936, Serial No. 67,827

3 Claims. (Cl. 263—53)

This invention relates to a method for calcining lime.

A primary object of this invention is to provide a method for calcining lime which is thermally and economically efficient, which results in a complete burning of the $CaCO_3$ with a minimum of over-burning, and produces a finished product of great uniformity. These and other desirable objects are obtained by the use of a rotary kiln which is provided with an enlarged calcining zone near the discharge end of the kiln, where the principal combustion takes place.

The burning of limestone in a rotary kiln is a highly desirable and well known method for obtaining CaO, commonly termed quicklime or caustic lime. In the burning process the limestone, which is primarily calcium carbonate, $CaCO_3$, is decomposed by heat into $CO_2$, which is driven off as a gas, and CaO, which remains. During the burning process, the dry lime decreases its weight by 44%, and decreases in volume by 15 to 20%. The temperatures at which this dissociation takes place are theoretically in the range of 750 to 900° C. although the presence of magnesium carbonate in the raw material may reduce the dissociation temperature somewhat. But in commercial production of lime, in order to expedite production, the temperatures in the kiln are considerably higher, and may reach 1200° C.

One of the chief obstacles to the use of rotary kilns for lime burning is the danger of overburning. Overburning—the exposure of the lime or limestone to too high a temperature—results in an inert lime or clinker, which cannot be slaked to produce $Ca(OH)_2$. This may be due to one or both of the following causes:

1. The presence of clayey impurities in the lime which at high temperatures combine with the limestone to form a clinker which may be a very good natural cement but is an undesirable impurity in the lime; and 2. Reaction between the lime being burned and the material of the lining of the kiln, resulting in undesirable clinkers.

For this reason overburning of lime is a real problem which has never been wholly satisfactorily solved in prior known rotary lime burning kilns. Among the other disadvantages of lime burning in rotary kilns as heretofore practised are the relatively large proportions of overburned and undercalcined lime, the large heat losses, and lack of uniformity in the final product. All of these disadvantages are overcome by the present invention.

The invention is illustrated in the accompanying drawing, wherein:

Fig. 1 is a diagrammatic elevational view of a kiln made in accordance with this invention; and Fig. 2 is a cross section taken on the line II—II of Fig. 1.

The kiln assembly comprises an inclined rotary kiln 10 rotated by means of motor 11 through the intermediary of pinion 12 and gear 13. Limestone in a dry form or in the form of a wet slurry or calcium carbonate such as shells is fed into the feed end of the kiln at 14 and, due to the inclination and rotation of the kiln, the material flows gradually through the length of the kiln to the discharge end at 15. A fuel nozzle is illustrated at 16 to deliver a flame indicated at 17. It will be noted that most of the combustion takes place in the enlarged zone indicated at 18. In a typical installation the kiln is more than 300 feet in length and eight feet in diameter, while the enlarged zone 18 is thirteen feet in diameter.

As the limestone or other form of calcium carbonate is fed into the rotating kiln at 14, the material comes into contact with the hot kiln walls and the hot products of combustion and is thereby dried and preheated. The material travels along the kiln and enters the enlarged calcining zone 18 in a dry and preheated condition. Here the actual calcination takes place. It will be noted that the walls 19 at the extremities of the enlarged calcining zone serve to withhold and reflect the heat of the flame 17, tending to retain it in the calcining zone and directing it against the material being treated. This, combined with the fact that most of the heat is generated in the calcining zone where it is most needed, results in a decidedly improved thermal efficiency for the kiln.

It will be further noted that, because of the enlarged cross section of the calcining zone, the heat generated, instead of being concentrated on a small area of material indicated by the surface $A_1$—$A_2$, is spread over a larger area, as indicated by the surface $B_1$—$B_2$ (Fig. 2). This diffusion of the heat generated results in a lower average temperature for the material in the calcining zone, thus resulting in elimination of overburned lime in the product. Moreover, it will be noted that the depth of the material is much greater in the enlarged calcining zone than in the remainder of the kiln. From this it follows that the axial flow of material through the enlarged calcining zone is much slower than it is in the remainder of the kiln. As a result of this more gradual flow of material in the calcining zone the material is exposed to the influence of the flame and high temperatures for a longer period of time, so that it is thoroughly and uniformly calcined. The enlarged calcining drum, since it serves to hold the hot material in the highly heated zone for a relatively long period of time, may be termed a soaking pit.

An unexpected advantage derived from the use of an enlarged calcining zone may be understood from the following consideration: During the rotation of the kiln when the material being treated reaches its normal angle of repose, it begins to fall, roll or slide down from the uppermost point indicated by $A_1$ in Fig. 2 to the lowermost point indicated by $A_2$, in the kiln of normal diameter. In the enlarged calcining zone, however, the material moves under the action of gravity from the point $B_1$ to the point $B_2$. This greater distance of movement of the material results in a rapid movement of the material past the zone of extreme heat indicated by the reference numeral 20 in Fig. 1, whereas in the kilns as heretofore built all the exposed material is within this zone of extreme heat during all of the time when it is in the calcining zone, resulting in a large percentage of overburned material. In a kiln provided with an enlarged calcining zone the material, although it remains within the calcining zone or soaking pit for a much longer period of time, is within the zone of extreme high temperature (indicated by the reference numeral 20 of Fig. 1) for a very brief period of time, thus further militating against overburning of the material.

It has been found that lime burned in a kiln of this type has a remarkably low proportion of overburned (inactive or clinkered lime) or undercalcined ($CaCO_3$) product.

The method of calcining lime as practised in the use of the kiln disclosed comprises passing a raw material such as limestone or oyster shells through a rotating kiln or other heated zone to effect removal of moisture therefrom; and then passing said dried material at a reduced rate of speed through a highly heated zone or soaking pit, whereby a completely calcined and uniform product results.

The term "enlarged calcining zone" as used in the claims is defined as a zone in the kiln subjected to a higher temperature and having a larger diameter than the remainder of the kiln.

The terms "raw material" and "calcium carbonate" as used in the claims refer to limestone, dolomite, shells, etc.—materials which are primarily calcium carbonate but which may contain varying proportions of magnesium carbonate and impurities and which are commonly used as the raw material from which quicklime is obtained.

While a specific construction has been described for purposes of illustration, the invention is not limited to the specific temperatures and proportions illustrated, since obvious modifications will be apparent to those skilled in the art.

It is claimed and desired to secure by Letters Patent:

1. The method of calcining calcium carbonate which comprises introducing the raw material into the feed end of a rotating kiln provided with an enlarged calcining zone adjacent the discharge end thereof, providing a flame substantially entirely within said calcining zone, and transferring said material from said calcining zone to a zone of lower temperature.

2. The method of calcining calcium carbonate which comprises passing the raw material through the full length of a rotary kiln having an enlarged calcining zone adjacent the discharge end thereof, causing the combustion for heating said kiln to take place principally within said calcining zone, whereby the heat of combustion is diffused over a larger area of material being treated and whereby the material is caused to remain in the calcining zone for a relatively long period of time, and removing said material from said calcining zone to a cooler zone.

3. The method of calcining calcium carbonate which comprises passing said calcium carbonate through a low temperature drying and preheating zone at a predetermined rate of travel, passing the preheated calcium carbonate through a calcining zone having an annular zone at an intermediate temperature and a central zone of high temperature at a reduced rate of travel, tumbling the calcium carbonate in said calcining zone so that it will rapidly pass through the central high temperature zone, and removing the calcined material from said calcining zone to a zone of lower temperature.

RAY C. NEWHOUSE.